(12) United States Patent
Eun et al.

(10) Patent No.: US 7,724,346 B2
(45) Date of Patent: May 25, 2010

(54) METHOD FOR ADJUSTING AMOUNT OF LIQUID CRYSTAL IN AN LCD DEVICE INCLUDING FORMING A REPAIR REGION BY IRRADIATING A LIGHT ONTO A SEALING MEMBER HAVING A THICKNESS WITH AN INCLUDED METAL PATTERN CAPABLE OF BEING BURNT DOWN

(75) Inventors: Chong Chan Eun, Paju-si (KR); Sang Ho Park, Paju-si (KR); Tae Man Kim, Paju-si (KR); Jun Beom Cho, Anseong-si (KR); Chang Gun Song, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 595 days.

(21) Appl. No.: 11/635,722

(22) Filed: Dec. 7, 2006

(65) Prior Publication Data

US 2007/0296906 A1 Dec. 27, 2007

(30) Foreign Application Priority Data

Jun. 26, 2006 (KR) ...................... 10-2006-0057195

(51) Int. Cl.
G02F 1/13 (2006.01)
(52) U.S. Cl. .................. 349/192; 349/153; 349/190
(58) Field of Classification Search ................ 349/153, 349/154, 187, 190, 192
See application file for complete search history.

(56) References Cited

U.S. PATENT DOCUMENTS

| 4,610,510 A | * | 9/1986 | Funada et al. ............... 349/187 |
| 2005/0219454 A1 | * | 10/2005 | Lee ............................. 349/153 |
| 2005/0275792 A1 | * | 12/2005 | Chen et al. .................. 349/192 |

* cited by examiner

Primary Examiner—John Heyman
(74) Attorney, Agent, or Firm—Brinks Hofer Gilson & Lione (57) ABSTRACT

A method for adjusting an amount of liquid crystal in a liquid crystal display (LCD) device includes injecting a liquid crystal into a liquid crystal receiving space. The liquid crystal receiving space is disposed between a first substrate, a second substrate that faces the first substrate, and a sealing member interposed between the first and second substrates. The method for adjusting an amount of liquid crystal in an LCD device further includes irradiating a light to a portion of the sealing member while varying an irradiating angle of the light so as to form a repair region at the sealing member that has a thickness smaller than that of the sealing member. The method for adjusting an amount of liquid crystal in an LCD device also comprises pressurizing the liquid crystal to form an opening in the repair region of the sealing member and discharge some of the liquid crystal from the liquid crystal receiving space through the opening formed in the repair region, and sealing the opening of the repair region.

14 Claims, 6 Drawing Sheets

METHOD FOR ADJUSTING AMOUNT OF LIQUID CRYSTAL IN AN LCD DEVICE INCLUDING FORMING A REPAIR REGION BY IRRADIATING A LIGHT ONTO A SEALING MEMBER HAVING A THICKNESS WITH AN INCLUDED METAL PATTERN CAPABLE OF BEING BURNT DOWN

This application claims priority to Korean Patent Application No. 57195/2006 filed on Jun. 26, 2006, the entirety of which is incorporated herein by reference.

FIELD

The present invention relates to a method for adjusting the amount of liquid crystal in a liquid crystal display (LCD) device, and more particularly, to a method for adjusting the amount of liquid crystal in an LCD device for precisely controlling excessively injected liquid crystal.

BACKGROUND

An information processing apparatus that can quickly process a large amount of data, and a display device that displays data processed by the information processing apparatus as an image are under rapid development.

LCD devices are the most representative display devices. LCD devices display an image using liquid crystal. Liquid crystal changes its molecular arrangement when an electric field is applied (an electrical behavior) and transmits light at different light transmitting indices (transmittances) depending on its molecular arrangement (an optical behavior).

For displaying an image using liquid crystal, an LCD device includes a liquid crystal controlling part that controls the arrangement or alignment of liquid crystal molecules and a light providing part that provides light to the liquid crystal controlling part.

The liquid crystal controlling part includes a pair of facing substrates and a liquid crystal layer formed between the substrates. The substrates generate an electric field for driving the liquid crystal layer. Generally, the liquid crystal layer has a very thin thickness of about several micrometers.

The thin liquid crystal layer is formed between the substrates by a vacuum injection method, a drop filling method, and so on.

In the vacuum injection method, a vacuum is formed between the substrates and then liquid crystal is injected between the substrates. In the drop filling method, liquid crystal is dropped onto one of the substrates and then the other substrate is coupled to the substrate where the liquid crystal is dropped.

However, when the liquid crystal is not sufficiently injected between the substrates, a void can be formed between the substrates. In this case, an image is not displayed at the void.

On the other hand, when the liquid crystal is excessively injected between the substrates, the liquid crystal moves down by gravity when the LCD device is placed in an upright position. In this case, an image is not properly displayed at a lower portion of the LCD device.

SUMMARY

A method for adjusting an amount of liquid crystal in a liquid crystal display (LCD) device includes injecting a liquid crystal into a liquid crystal receiving space. The liquid crystal receiving space is disposed between a first substrate, a second substrate that faces the first substrate, and a sealing member interposed between the first and second substrates. The method for adjusting an amount of liquid crystal in an LCD device further includes irradiating a light to a portion of the sealing member while varying an irradiating angle of the light so as to form a repair region at the sealing member that has a thickness smaller than that of the sealing member. The method for adjusting an amount of liquid crystal in an LCD device also comprises pressurizing the liquid crystal to form an opening in the repair region of the sealing member and discharge some of the liquid crystal from the liquid crystal receiving space through the opening formed in the repair region, and sealing the opening of the repair region.

According to another embodiment of the present invention, a liquid crystal display (LCD) panel comprises a first substrate, a second substrate that faces the first substrate. A liquid crystal is disposed between the first and second substrates. The LCD panel further comprises a sealing member interposed between the first and second substrates, and a liquid crystal receiving space. The liquid crystal receiving space is disposed between the first substrate, the second substrate that faces the first substrate, and the sealing member interposed between the first and second substrates. The LCD panel also comprises a repair region at the sealing member that has a thickness smaller than that of the sealing member, and an opening in the repair region of the sealing member, wherein some of the liquid crystal from the liquid crystal receiving space is discharged through the opening disposed in the repair region.

According to yet another embodiment of the present invention, a liquid crystal display (LCD) apparatus comprises an LCD panel and a case that supports the LCD panel. The LCD panel comprises a first substrate, a second substrate that faces the first substrate. A liquid crystal is disposed between the first and second substrates. The LCD panel further comprises a sealing member interposed between the first and second substrates, and a liquid crystal receiving space. The liquid crystal receiving space is disposed between the first substrate, the second substrate that faces the first substrate, and the sealing member interposed between the first and second substrates. The LCD panel also comprises a repair region at the sealing member that has a thickness smaller than that of the sealing member, and an opening in the repair region of the sealing member, wherein some of the liquid crystal from the liquid crystal receiving space is discharged through the opening disposed in the repair region.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

A method for adjusting the amount of liquid crystal in an LCD device will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, dimensions of a first substrate, a second substrate, a sealing member, liquid crystal, a remaining sealing portion, a first reflecting mirror unit, a second reflecting mirror unit, and other elements and structures are exaggerated for clarity. It will also be understood that when an element or structure, such as a first substrate, a second substrate, a sealing member, liquid crystal, a remaining sealing portion, a first reflecting mirror unit, and a second reflecting mirror unit, is referred to as being "on", "above", or "under" another element or structure, it can be directly on, above or under another element or structure, or intervening elements or structures may also be present. Further, it will be understood that although the terms first and second are used herein to describe various elements or structures (e.g., a first substrate, a second substrate, a first reflecting mirror, or a second reflecting mirror), these elements or structures should not be limited by these terms. These terms are only used to distinguish one element or structure from another element or structure. Therefore, the terms first and second can be used selectively or interchangeably for elements or structures such as substrates and reflecting mirrors. For example, a first substrate could be termed as a second substrate, and similarly, a second substrate could be termed as a first substrate.

Figure 1:
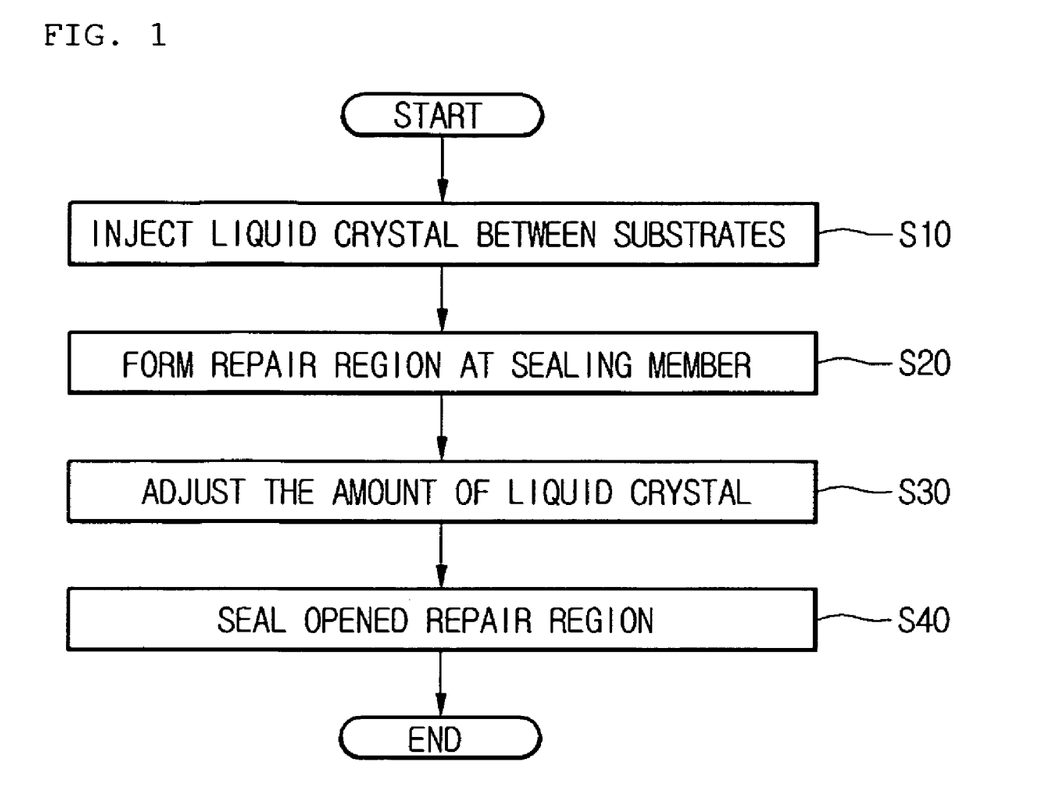
FIG. 1 is a flowchart for explaining a method for adjusting the amount of liquid crystal in an LCD device according to an embodiment of the present invention.
Figure 2:
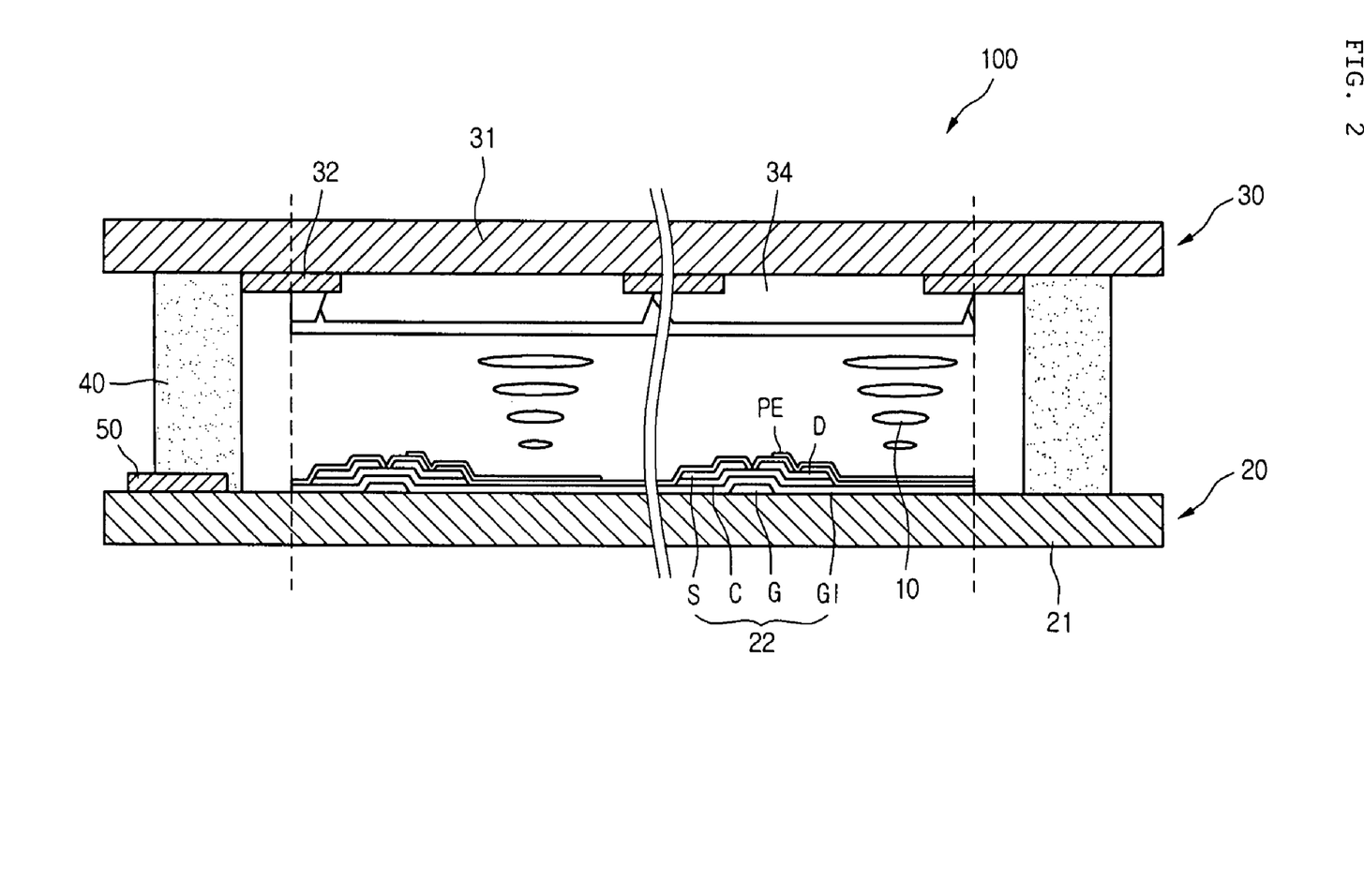
FIG. 2 is a cross sectional view illustrating an LCD device to which the method of FIG. 1 is applied.

FIG. 1 is a flowchart for explaining a method for adjusting the amount of liquid crystal in an LCD device according to an embodiment of the present invention, FIG. 2 is a cross sectional view illustrating an LCD device to which the method of FIG. 1 is applied.

Referring to FIGS. 1 and 2, in operation S10, liquid crystal is injected into an LCD device 100 to form a liquid crystal layer 10. Liquid crystal can be injected by a vacuum injection method or a drop filling method.

The LCD device 100 will now be described in detail with reference to FIG. 2.

The LCD device 100 includes a first substrate 20, a second substrate 30, the liquid crystal layer 10, a sealing member 40, and a metal pattern 50.

The first substrate 20 includes a first transparent substrate 21 such as a glass substrate, thin film transistors 22, and pixel electrodes PE.

The thin film transistors 22 are formed on the first transparent substrate 21. A plurality of thin film transistors is formed on the first transparent substrate 21 in accordance with the resolution of the LCD device 100. For example, when the resolution of the LCD device 100 is 1024×768, 1024×768×3 thin film transistors 22 may be formed on the first transparent substrate 21 in a matrix format.

Each of the thin film transistors 22 includes a gate electrode G connected to a gate line (not shown), a gate insulation layer GI insulating the gate electrode G, a channel pattern C formed on the gate insulation layer GI above the gate electrode G, a source electrode S and a drain electrode D that are formed on the channel pattern C. The channel pattern C may include an n+ amorphous silicon pattern (not shown) formed by ion-doping an amorphous silicon pattern with a conductive impurity to a high concentration. The source electrode S is connected to a data line (not shown) formed perpendicular to the gate line. The source electrode S and the drain electrode D are formed on the channel pattern C at a predetermined distance from each other.

The pixel electrode PE is electrically connected to the drain electrode D of the thin film transistor 22. Preferably, the pixel electrode PE includes a transparent conductive material. The pixel electrode PE may be formed of a material such as an indium tin oxide (ITO), an indium zinc oxide (IZO), or an amorphous indium tin oxide (a-ITO).

The second substrate 30 includes a second transparent substrate 31 such as a glass substrate, a black matrix 32, and a color filter 34.

The black matrix 32 is formed under the second transparent substrate 31. The black matrix 32 may be formed of a material having a high light absorbance such as chrome, a chrome oxide, and a black resin. When viewed from the top in FIG. 2, the black matrix 32 is formed between the pixel electrodes (PE) formed on the first substrate 20. Since the pixel electrodes (PE) of the first substrate 20 are arranged in a matrix format, the black matrix 32 can have a grid shape. The black matrix 32 screens the thin film transistors 22 arranged on the first substrate 20. Further, the back matrix 32 absorbs light incident from the outside, thereby improving the contrast of a displaying image.

The color filter 34 is formed in each opening defined by the black matrix 32. The color filter 34 formed in each opening of the black matrix 32 includes a red (R) color filter transmitting a red light component of white light, a green (G) color filter transmitting a green light component of white light, and a blue (B) color filter transmitting a blue light component of white light.

The sealing member 40 is disposed between the first and second substrates 20 and 30. For example, the sealing member 40 can be formed between edges of the first and second substrates 20 and 30 to provide a liquid crystal receiving space between the first and second substrates 20 and 30. The sealing member 40 may include a photocurable material that is hardened by light such as ultraviolet rays.

The liquid crystal layer 10 is filled in the liquid crystal receiving space formed by the sealing member 40. The liquid crystal layer 10 may include twist nematic liquid crystal, vertical alignment liquid crystal, or the like.

Figure 3:
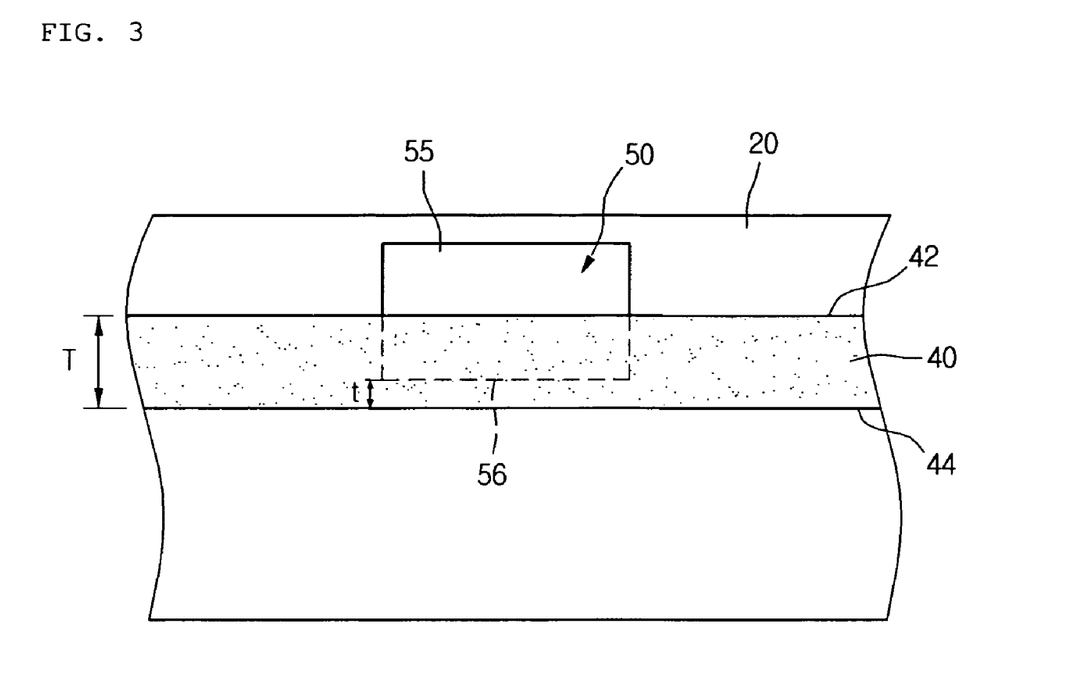
FIG. 3 is a partial sectional view illustrating an arrangement of a metal pattern and a sealing member in the LCD device of FIG. 2.

FIG. 3 is a partial sectional view illustrating an arrangement of the metal pattern 50 and the sealing member 40.

Referring to FIGS. 2 and 3, the metal pattern 50 may be formed on the first substrate 20. In detail, the metal pattern 50 is formed between the sealing member 40 and the first substrate 20. The metal pattern 50 may have a rectangular shape in a plan view. The metal pattern 50 and the sealing member 40 are formed overlapping each other.

The metal pattern 50 is formed at an outer side 42 of the sealing member 40 opposite to an inner side 44 of the sealing member 40 contacting the liquid crystal layer 10 as shown in FIG. 2. When the thickness of the sealing member 40 is T, the overlapping region between the metal pattern 50 and the sealing member 40 occupies about 85% to 95% of the thickness (T). Therefore, the non-overlapping region of the sealing member 40 with the metal pattern 50 has a thickness (t) ranging from 5% to 15% of the total thickness T of the sealing member 40. The overlapping region of the metal pattern 50 with the sealing member 40 will now be denoted by reference numeral 56, and the remaining non-overlapping region (exposed region) will be denoted by reference numeral 55.

Meanwhile, a portion of the sealing member 40 corresponding to the metal pattern 50 will now be referred to as a repair region.

According to one embodiment of the present invention, the metal pattern 50 may be formed of the same material as the gate electrode G, the source/drain electrodes S and D, or the pixel electrode PE of the thin film transistor 22. That is, the metal pattern 50 can be formed of aluminum, an aluminum alloy, ITO, IZO, or a-ITO.

Referring again to FIGS. 1 and 2, after the liquid crystal layer 10 is formed in the LCD device 100, it is determined whether liquid crystal was excessively injected into the LCD device 100. If so, the excessive amount of the injected liquid crystal is drawn back from the LCD device 100.

Figure 4:
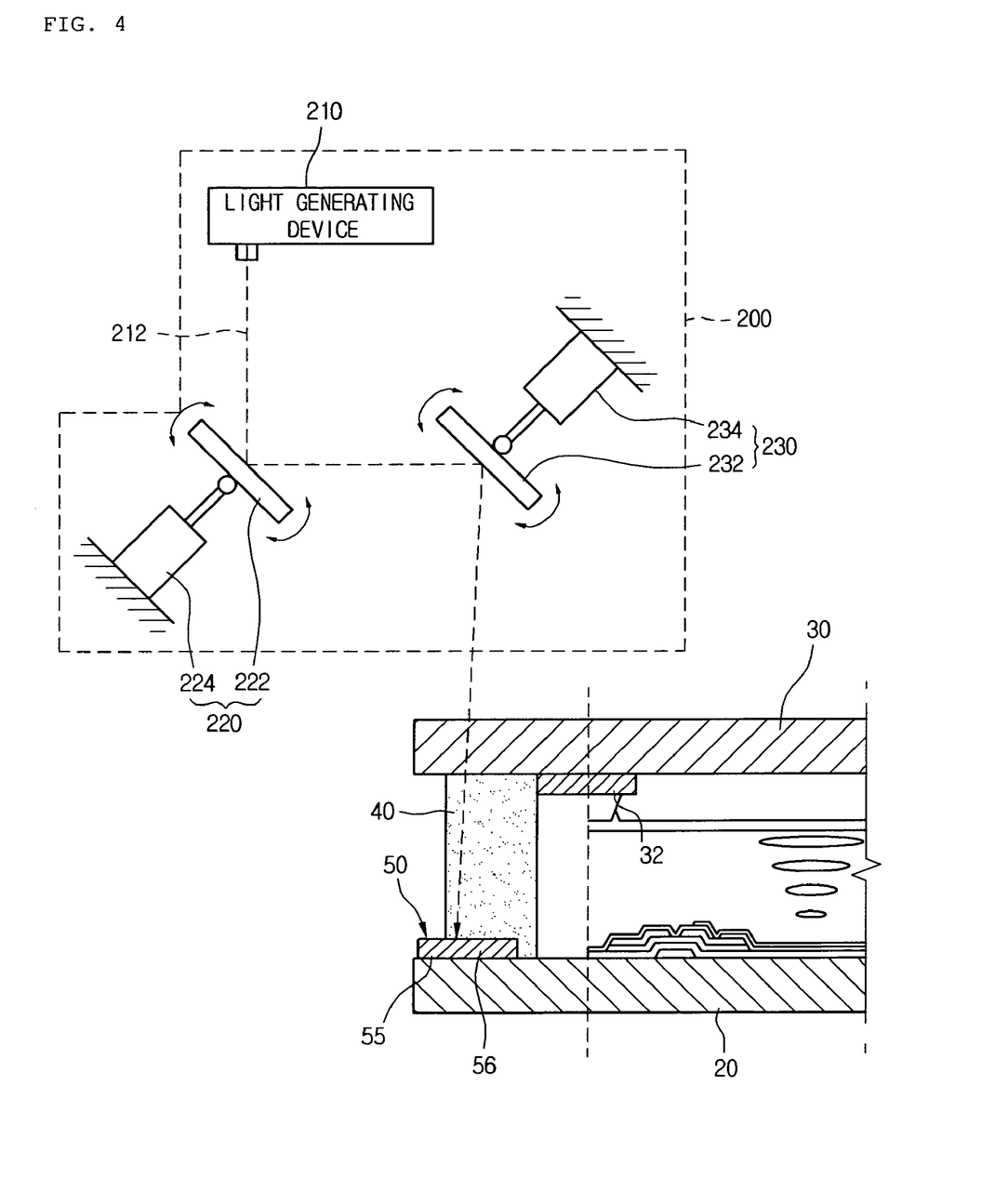
FIG. 4 is a view illustrating removing of an overlapped region between the sealing member and the metal pattern depicted in FIG. 3 by using a laser beam.
Figure 5:
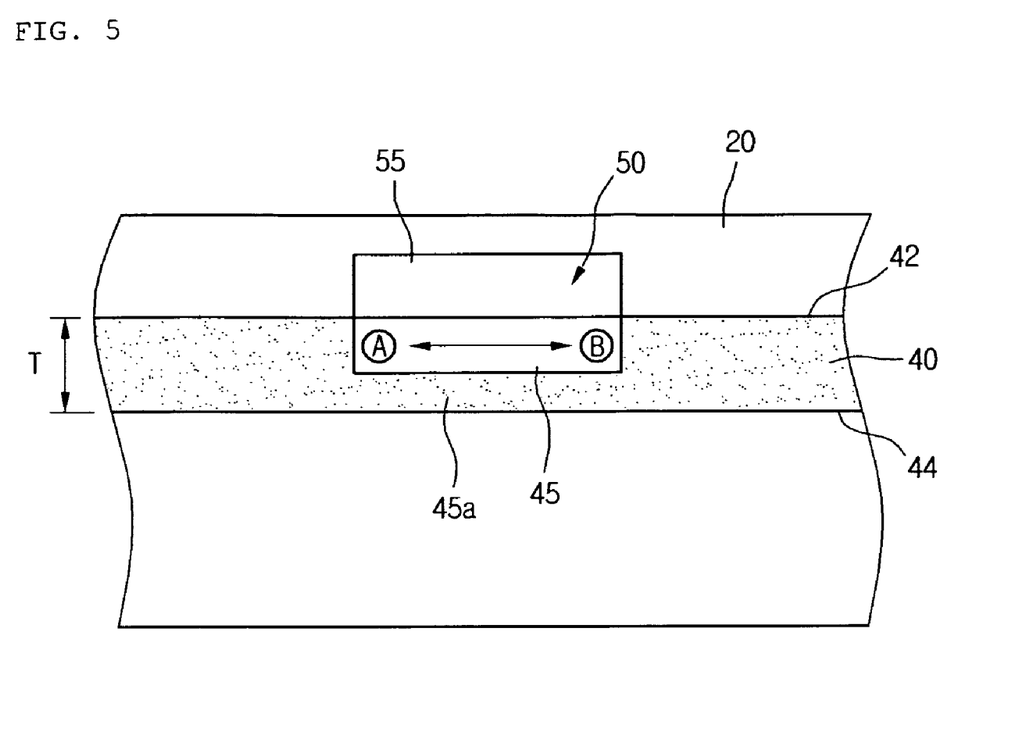
FIG. 5 is a plan view illustrating a repair region of the sealing member.

FIG. 4 is a view illustrating removing of the overlapped region between the sealing member 40 and the metal pattern 50 using a laser beam, and FIG. 5 is a plan view illustrating a repair region of the sealing member 40.

Referring to FIGS. 4 and 5, in order to adjust the amount of liquid crystal of the liquid crystal layer 10 by discharging the excessive amount of the liquid crystal from the liquid crystal layer 10, light 212 is irradiated to the overlapping region 56 of the metal pattern 50 to form a repair region 45 in operation S20 (refer to FIG. 1).

Here, the light 212 is irradiated to the overlapping region 56 of the metal pattern 50 in a length direction of the overlapping region 56, thereby forming the repair region 45 at the sealing member 40.

A light generating equipment 200 generating the light 212 or the LCD device 100 is conveyed to irradiate the light 212 in the length direction of the overlapping region 56. In other words, the light generating equipment 200 should be conveyed while fixing the LCD device 100, or the LCD device 100 should be conveyed while fixing the light generating equipment 200.

However, when the LCD device 100 or the light generating equipment 200 is conveyed, the light 212 may be irregularly irradiated because of vibrations or impacts arising during the conveying of the LCD device 100 or the light generating equipment 200.

According to one embodiment of the present invention, to prevent this problem, the light 212 is irradiated along the length direction of the overlapping region 56 while varying the irradiating angel of the light 212, instead of conveying the light generating equipment 200 or the LCD device 100.

The light generating equipment 200 includes a light generating unit 210. The light generating unit 210 may generate a laser beam. The light 212 may have a wavelength in the range of 800 nm to 1200 nm. When the wavelength of the light 212 is greater than 1200 nm, the second substrate 30 and the sealing member 40 can be damaged by the light 212. On the other hand, the wavelength of the light 212 is lower than 800 nm, it is difficult to provide sufficient energy to the metal pattern 50 because of a low energy level of the light 212. Therefore, it is preferable that the wavelength of the light 212 be in the range of 800 nm to 1200 nm.

Meanwhile, to form the repair region 45 at the sealing member 40 by varying the irradiating angle of the light 212 instead of conveying the LCD device 100 or the light generating equipment 200, a light reflecting mirror unit is used. Here, a rotating unit can be included in the light reflecting mirror unit to precisely varying the reflection angle of the light 212.

To form the repair region 45 at the sealing member 40 by varying the irradiating angle of the light 212 without moving the LCD device 100 or the light generating equipment 200, at least two light reflecting mirror units can be used to reflect light 212 emitted from the light generating unit 210. In this case, each of the light reflecting mirrors may include a rotating unit to precisely varying the reflection angle of the light 212.

In detail, the light generating equipment 200 includes the light generating unit 210, a first reflecting mirror unit 220, and a second reflecting mirror unit 230.

The light generating unit 210 generates, for example, a laser beam. According to one embodiment of the present invention, the light generating unit 210 emits a laser beam having a wavelength in the range of about 800 nm to 1200 nm, and the laser beam is reflected to the overlapping region 56 of the metal pattern 50 by the first and second reflecting mirror units 220 and 230. Then, the metal pattern 50 is burnt by the optical energy of the irradiated laser beam.

The first reflecting mirror unit 220 includes a first reflecting mirror 222 and a first reflecting mirror driving unit 224. The first reflecting mirror driving unit 224 adjusts the angle of the first reflecting mirror 222 such that the first reflecting mirror 222 can reflect incident light at a desired angle. According to one embodiment of the present invention, the first reflecting mirror 222 reflects incident light onto a second reflecting mirror 234 of the second reflecting mirror unit 230.

The second reflecting mirror unit 230 includes the second reflecting mirror 232 and a second reflecting mirror driving unit 234. The second reflecting mirror driving unit 234 adjusts the angle of the second reflecting mirror 232 such that the second reflecting mirror 232 can reflect incident light at a desired angle. According to one embodiment of the present invention, the second reflecting mirror 232 reflects incident light onto the overlapping region 56 of the metal pattern 50.

According to one embodiment of the present invention, the first reflecting mirror 222 and the second reflecting mirror 232 can be rotated in perpendicular directions to each other.

FIG. 5 is a plan view illustrating a traveling path of light irradiated onto the overlapping region 56 by the first and second reflecting mirrors 222 and 232.

Referring to FIGS. 4 and 5, light 212 is emitted from the light generating unit 210 to the first reflecting mirror 222 and then is reflected from the first reflecting mirror 222 to the second reflecting mirror 232. Next, the light 212 is reflected from the second reflecting mirror 232 to the overlapping region 56 of the metal pattern 50. Here, the second reflecting mirror driving unit 234 rotates the second reflecting mirror 234 to reflect the light 212 onto the overlapping region 56 from one end A to the other end B of the overlapping region 56. Then, the light can be reflected from the other end B back to the one end A. That is, the light 212 is irradiated in the length direction of the sealing member 40.

In this way, the light 212 is repeatedly irradiated between the one end A and the other end B by the second reflecting mirror 232 and the second reflecting mirror driving unit 234, so that the overlapping region 56 of the metal pattern 50 can be rapidly heated by the light 212 and thus burnt down.

Meanwhile, while the overlapping region 56 of the metal pattern 50 is burnt, a portion of the sealing member 40 contacting the overlapping region 56 is also removed, thereby forming the repair region 45 having a significantly-decreased width at the sealing member 40. According to one embodiment of the present invention, the repair region 45 has a recessed shape.

Since the light 212 is irradiated to the overlapping region 56 while the irradiating angle of the light 212 is adjusted using the first and second reflecting mirror units 220 and 230, the thickness (t) of the repair region 45 can be very uniform.

Referring again to FIG. 1, after the repair region 45 is formed at the sealing member 40, the excessive amount of liquid crystal injected into the liquid crystal layer 10 of the LCD device 100 is adjusted through the repair region 45 in operation S30.

For this adjustment, a pressure is applied to the LCD display 100, and the applied pressure is transmitted to the liquid crystal layer 10. Then, the pressure is transmitted to the repair region 45 of the sealing member 40. If the pressure acting on the repair region 45 is larger than the strength of the repair region 45, the repair region 45 is broken.

Then, excessively injected liquid crystal is discharged from the LCD device 100 through the broken repair region 45, so that the amount of liquid crystal of the liquid crystal layer 10 can be properly adjusted.

Figure 6:
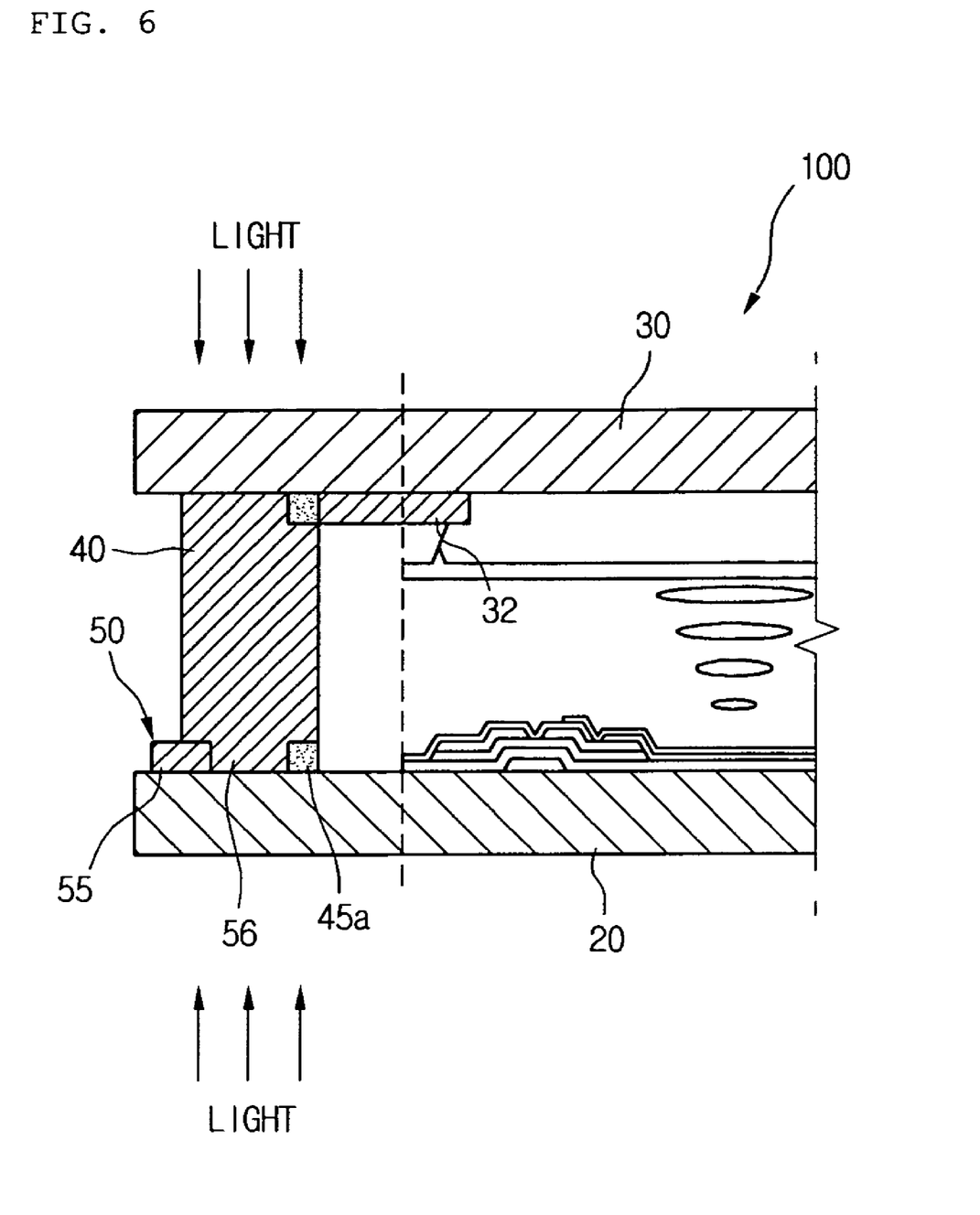
FIG. 6 is a sectional view illustrating resealing of a broken repair region of the sealing member depicted in FIG. 5.

FIG. 6 is a sectional view illustrating resealing of the broken repair region 45.

Referring to FIG. 6, although the excessively injected liquid crystal can be discharged through the broken repair region 45, outside air can also be introduced into the liquid crystal layer 10 through the broken repair region 45.

To prevent this inflow of the outside air, a curable material is applied to the broken repair region 45 and then the curable material is hardened in operation S40.

In detail, according to one embodiment of the present invention, a photocurable material 70 is applied to the broken repair region 45, and then light is irradiated to the photocurable material 70, thereby sealing the broken repair region 45. Preferably, the photocurable material 70 may be a UV-curable material. Alternatively, a thermocurable material can be used instead of the photocurable material 70.

As described above, after liquid crystal is injected into the LCD device, the LCD device is first sealed using a sealing member. If it is determined that the liquid crystal is excessively injected, a portion of the sealing member is sufficiently narrowed using light such as a laser beam. Next, a pressure is applied to the liquid crystal injected into the LCD device to broken the narrowed portion of the sealing member and discharge the excessive amount of the liquid crystal through the broken portion of the sealing member. Then, the broken portion of the sealing member is subsequently sealed using a sealing material such as a photocurable material. Therefore, the excessively injected liquid crystal can be easily discharged from the LCD device.

In the above-described embodiments, the overlapping region of the metal pattern is scanned with light by varying the scanning angle of the light using the first and second reflecting mirrors instead of moving the position of the LCD device and the light generating equipment. However, instead of the reflecting mirrors, a driving unit can be coupled to the light generating unit to scan the overlapping region of the metal pattern while rotating the light generating unit.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of adjusting an amount of liquid crystal in an LCD (liquid crystal display) device, the method comprising:
    injecting a liquid crystal into a liquid crystal display panel having a sealing member for forming a liquid crystal receiving space;
    irradiating a light to a portion of the sealing member while varying an irradiating angle of the light so as to form a repair region at the sealing member that has a thickness smaller than that of the sealing member and that corresponds to a metal pattern capable of being burnt down;
    pressurizing the liquid crystal to form an opening in the repair region of the sealing member and discharge some of the liquid crystal from the liquid crystal receiving space through the opening formed in the repair region; and
    sealing the opening of the repair region.

2. The method according to claim 1, wherein the light irradiated to the portion of the sealing member is provided to a metal pattern that overlaps the sealing member.

3. The method according to claim 1, wherein the repair region is formed at an outer side of the sealing member opposite to an inner side of the sealing member that contacts the liquid crystal.

4. The method according to claim 1, wherein the thickness of the repair region is about 5% to 15% of that of the sealing member.

5. The method according to claim 1, wherein the light is a laser beam that has a wavelength in a range of about 800 nm to 1200 nm.

6. The method according to claim 1, wherein the irradiating of the light comprises reflecting the light using a light reflecting mirror that has a light reflecting surface.

7. The method according to claim 6, wherein the irradiating of the light further comprises adjusting a light reflecting angle of the light reflecting mirror to control a scanning position of the light.

8. The method according to claim 1, wherein the irradiating of the light comprises:
    reflecting the light initially using a first light reflecting mirror; and
    reflecting the light subsequently using a second light reflecting mirror toward the sealing member.

9. The method according to claim 8, wherein the irradiating of the light further comprises adjusting light reflecting angles of the first and second light reflecting mirrors, respectively, so as to control a scanning position of the light.

10. The method according to claim 8, wherein a direction of the initially reflected light and a direction of the subsequently reflected light are substantially perpendicular to each other.

11. The method according to claim 1, wherein the repair region has a recess shape.

12. The method according to claim 1, wherein the light is irradiated to the portion of the sealing member in a length direction of the sealing member.

13. The method according to claim 1, wherein the sealing of the opening of the repair region comprises:
    applying a curable material to the repair region; and
    curing the curable material.

14. The method according to claim 13, wherein the curable material comprises a photocurable material cured by light or a thermocurable material cured by heat.

* * * * *